United States Patent [19]

Tran

[11] Patent Number: 5,059,015

[45] Date of Patent: Oct. 22, 1991

[54] VEHICULAR SIGNAL MIRROR APPARATUS

[76] Inventor: Donald Q. Tran, 10629 Orr and Day Rd., Sante Fe Springs, Calif. 90670

[21] Appl. No.: 555,187

[22] Filed: Jul. 20, 1990

[51] Int. Cl.$^5$ .......................... B60Q 1/00; B60Q 1/26; B60R 1/06; G02B 7/18

[52] U.S. Cl. ................................ 359/844; 362/83.1; 362/135; 362/142; 248/476; 248/479; 248/488; 340/463; 340/468; 340/475; 359/871; 359/872

[58] Field of Search ............... 350/600, 606, 631, 632; 362/83, 83.1, 135, 142; 248/474, 476, 479, 488; 340/463, 468, 475

[56] References Cited

U.S. PATENT DOCUMENTS

| | | | |
|---|---|---|---|
| 2,180,610 | 11/1939 | Ritz-Woller | 362/83.1 |
| 2,480,800 | 8/1949 | Wickwire | 362/142 |
| 2,600,751 | 6/1952 | Gazda | 362/83.1 |
| 4,661,800 | 4/1987 | Yamazaki | 362/83.1 |
| 4,890,907 | 1/1990 | Vu et al. | 350/612 |
| 4,916,430 | 4/1990 | Vu et al. | 362/83.1 |

FOREIGN PATENT DOCUMENTS

| | | | |
|---|---|---|---|
| 0138445 | 8/1982 | Japan | 350/600 |
| 0188242 | 8/1986 | Japan | 362/135 |
| 0218248 | 9/1987 | Japan | 362/83.1 |
| 2161440 | 1/1986 | United Kingdom | 350/632 |

Primary Examiner—Bruce Y. Arnold
Assistant Examiner—R. D. Shafer
Attorney, Agent, or Firm—Leon Gilden

[57] ABSTRACT

A side view mirror assembly for securement to each side of an associated vehicle. The mirror assembly includes a translucent lens projecting through an exterior side wall of an associated mirror housing wherein an illumination member is in electrical communication with the turning signals and emergency circuitry of an associated automobile. Modifications of the invention include a front mirror frame pivotal downwardly to provide access to an interior cavity of the mirror housing for storage of replacement bulbs and accessory items.

3 Claims, 4 Drawing Sheets

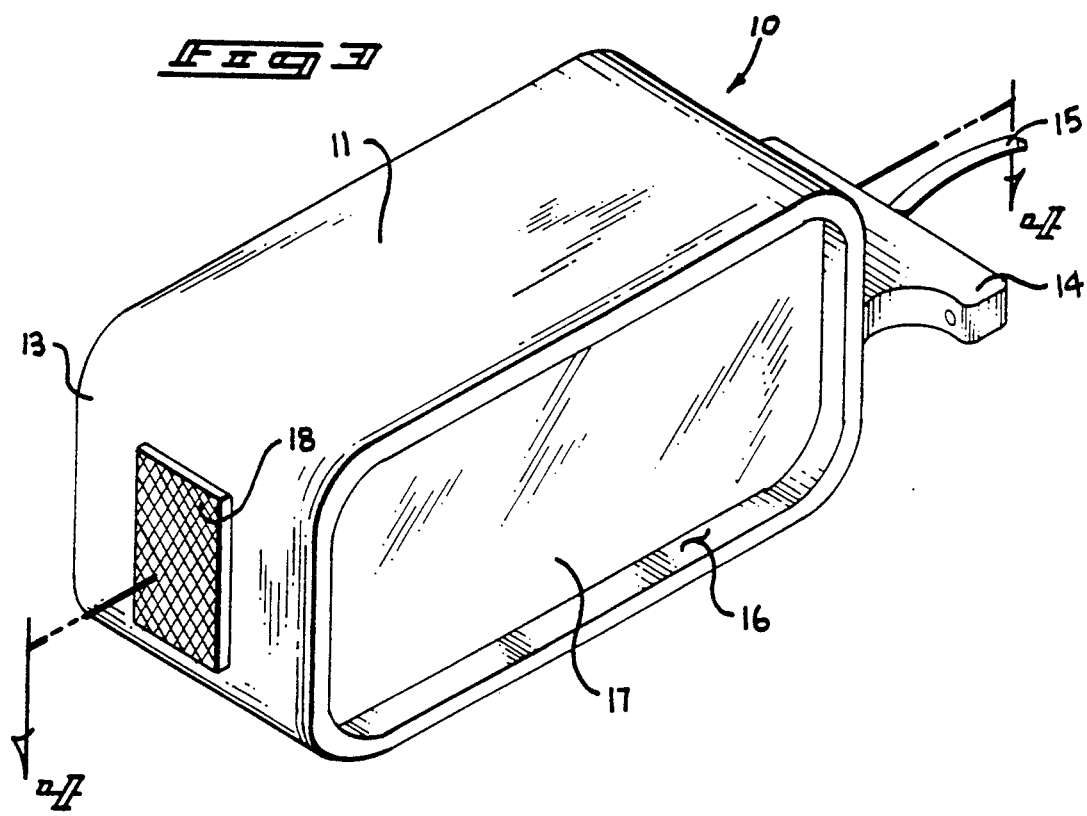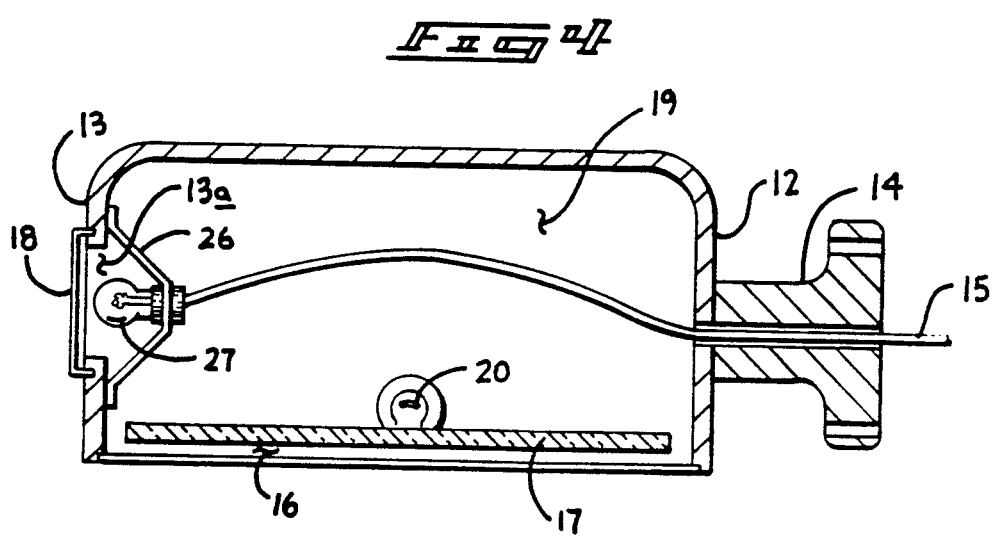

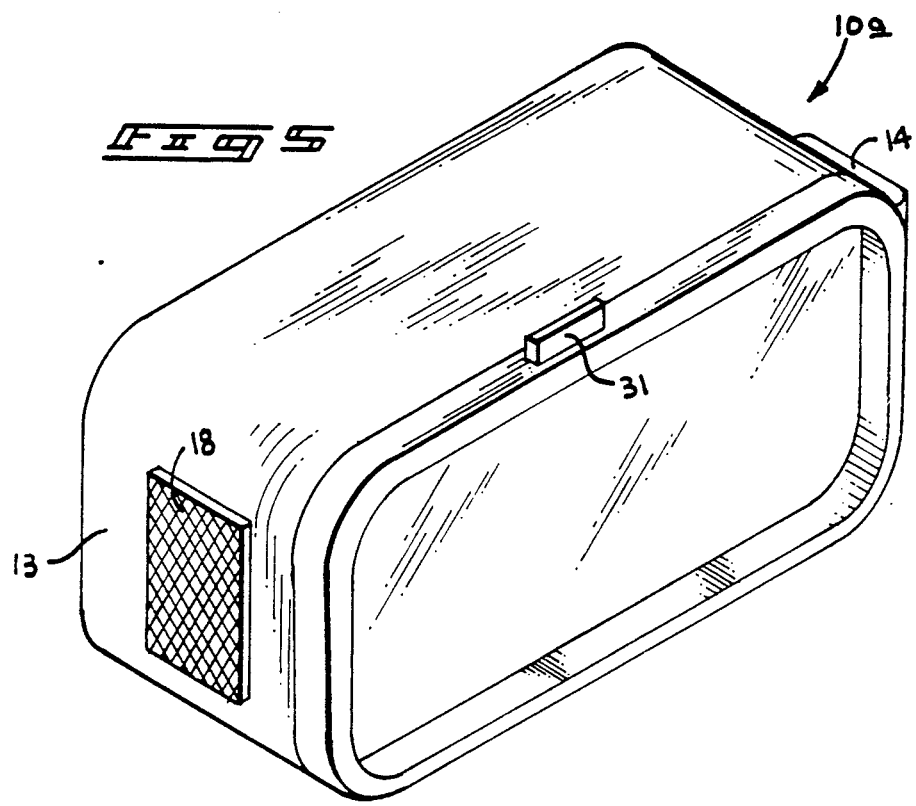
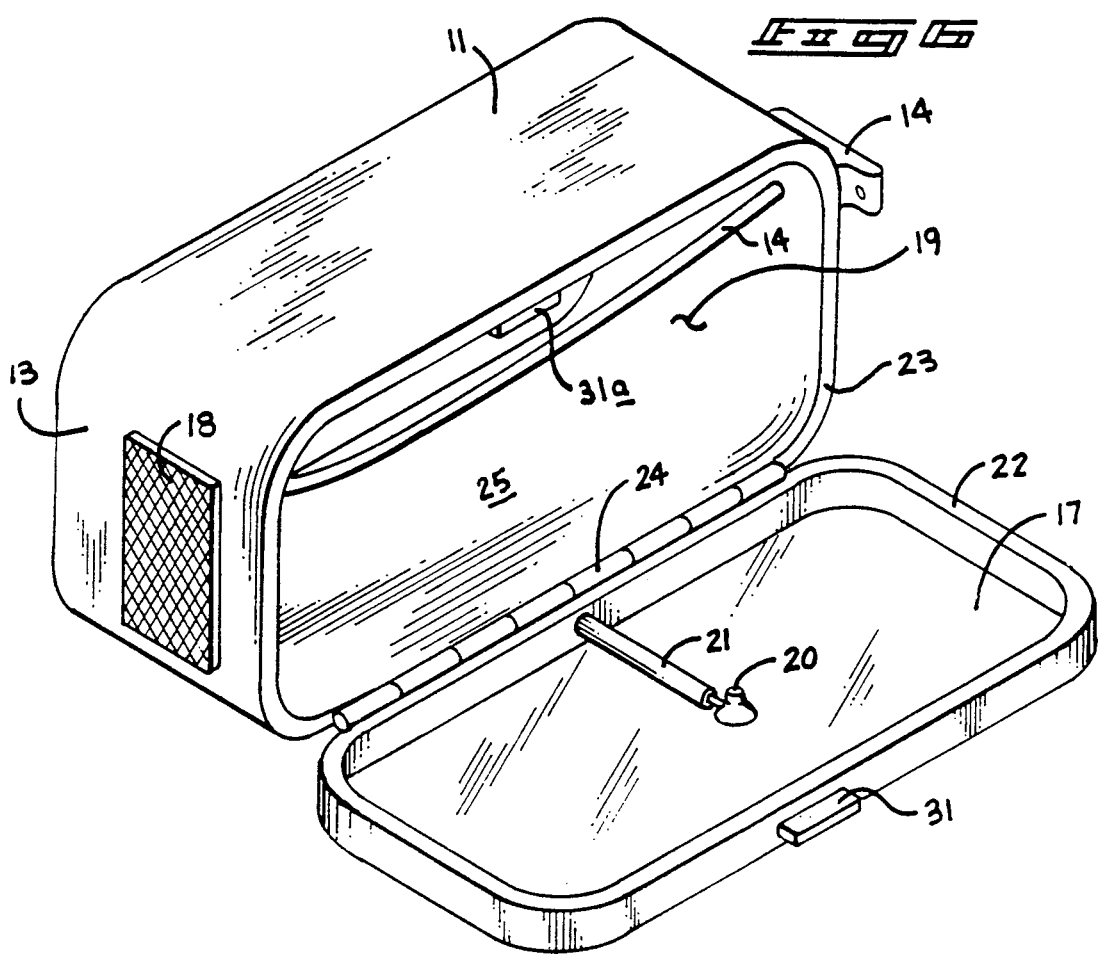

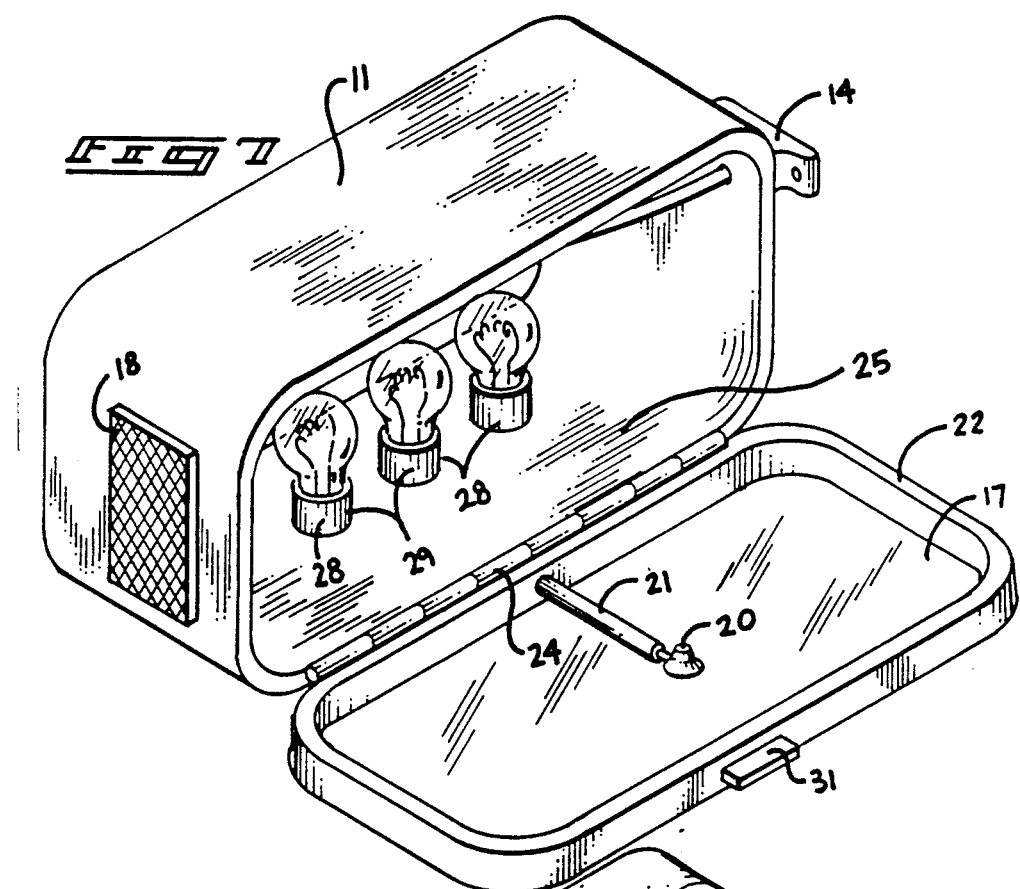
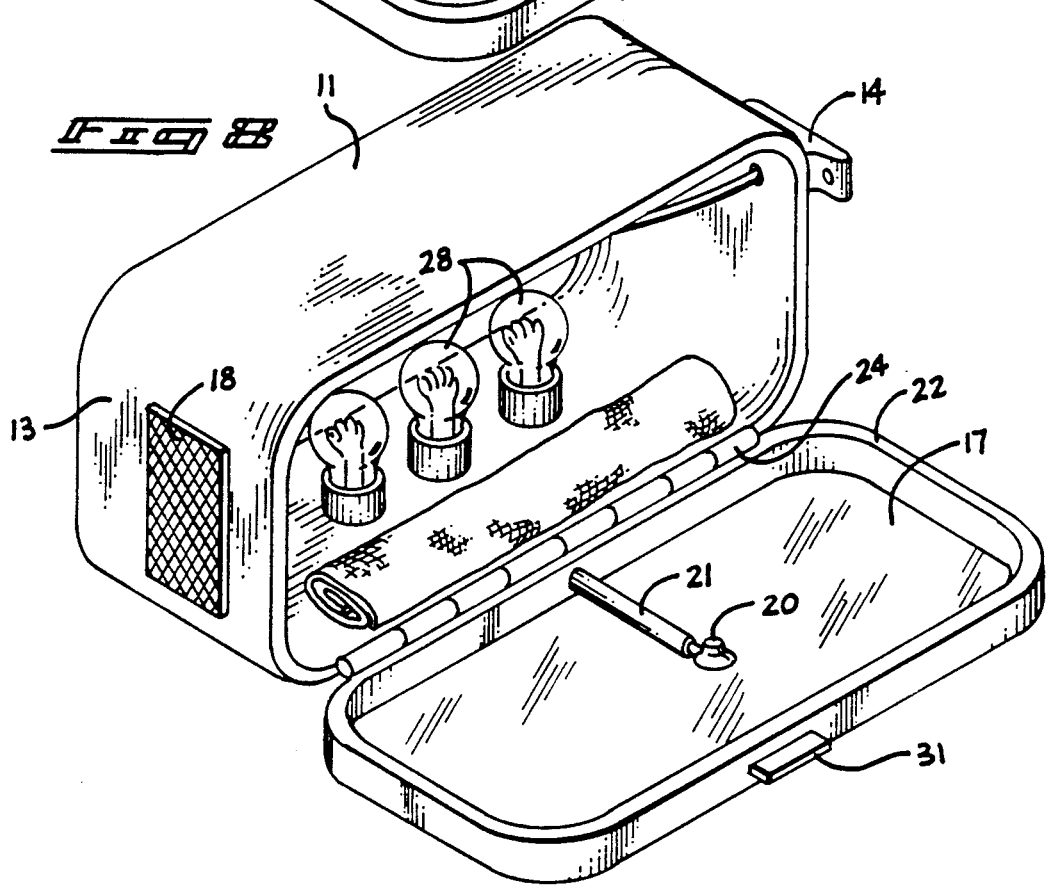

VEHICULAR SIGNAL MIRROR APPARATUS

BACKGROUND OF THE INVENTION

1. Field of the Invention

The field of the invention relates to vehicular signal structure, and more particularly pertains to a new and improved vehicular signal mirror apparatus wherein the same permits enhanced visual presentation of a signaling procedure by an associated motor vehicle.

2. Description of the Prior Art

Contemporary vehicular operation in present congested driving environments requires an enhanced degree of caution and indication of intended vehicular direction in an effort to provide indication to other motor vehicle operators of intended vehicular direction of an associated motor vehicle by a driver therewithin. The instant invention attempts to provide an initial degree of safety in the operation of a motor vehicle by including directional indication organization within side mirrors for use by a motor vehicle operator. The side mirror structure permits a driver of the associated vehicle to visually appreciate positioning of other motor vehicles and accordingly provides an enhanced element of safety by permitting indication to such other vehicles of intended direction of the motor vehicle. Examples of the prior art structure in association with side mirror organizations may be found in U.S. Pat. No. 1,904,300 to CANNON wherein structure utilizes a framework with an underlying mirror and an overlying housing including a right and left turn signal compartment wherein the organization is of a relatively elaborate and expansive organization as opposed to the compact unitary organization as set forth by the instant invention to minimize impedance of vision by an operator while utilizing the turn signal structure of the instant invention.

U.S. Pat. No. 3,522,584 to TALBOT sets forth a side mirror organization that may actually utilize illumination member therewithin for illumination of the housing upon opening of a door of an associated automobile.

U.S. Pat. No. 4,646,210 sets forth a vehicular rear view mirror for use interiorly of a vehicular compartment with various light members therewithin for lighting of various internal portions of an interior automotive environment.

U.S. Pat. No. 2,012,593 to STRONG sets forth an interior lamp for use by automobiles wherein the lamp is pivotally mounted to a rear view mirror structure mounted within an interior compartment of an associated motor vehicle.

U.S. Pat. No. 4,807,096 to SKOGLER sets forth an interior light module for use with a rear view mirror of an automobile mounted interiorly of the vehicular compartment to effect various lighting of interior portions of the automobile and operative by selective switching mounted within the rear view mirror.

As such, it may be appreciated that there continues to be a need for a new and improved vehicular signal mirror organization as set forth by the instant invention which addresses both the problems of ease of use as well as effectiveness in construction and in this respect, the instant invention substantially fulfills this need.

SUMMARY OF THE INVENTION

In view of the foregoing disadvantages inherent in the known types of side view mirror construction present in the prior art, the present invention provides a new and improved vehicular signal mirror organization wherein the same utilizes a turn signal organization in cooperation with a side mirror construction for enhanced operability and safety in operation of an associated automobile. As such, the general purpose of the present invention, which will be described subsequently in greater detail, is to provide a new and improved vehicular signal mirror organization which has all the advantages of the prior art side view mirror structure and none of the disadvantages.

To attain this, the vehicular signal mirror organization of the instant invention includes apparatus wherein side mirror construction for securement to each side of an associated vehicle includes a translucent lens projecting through an exterior side wall of an associated mirror housing wherein an illumination member usually a bulb is in electrical communication with the signal and emergency circuitry of an associated automobile. Modifications of the invention include a front mirror frame pivotal downwardly to provide access to an interior cavity of the mirror housing for storage of replacement bulbs and accessory items therewithin.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

It is therefore an object of the present invention to provide a new and improved vehicular signal mirror organization which has all the advantages of the prior art side view mirror structure and none of the disadvantages.

It is another object of the present invention to provide a new and improved vehicular signal mirror apparatus which may be easily and efficiently manufactured and marketed.

It is a further object of the present invention to provide a new and improved vehicular signal mirror apparatus which is of a durable and reliable construction.

An even further object of the present invention is to provide a new and improved vehicular signal mirror apparatus which is susceptible of a low cost of manufacture with regard to both materials and labor, and which accordingly is then susceptible of low prices of sale to the consuming public, thereby making such vehicular signal mirror apparatus economically available to the buying public.

Still yet another object of the present invention is to provide a new and improved vehicular signal mirror apparatus which provides in the apparatuses and methods of the prior art some of the advantages thereof, while simultaneously overcoming some of the disadvantages normally associated therewith.

Still another object of the present invention is to provide a new and improved vehicular signal mirror apparatus which may be compactly stored when not being utilized.

Yet another object of the present invention is to provide a new and improved vehicular signal mirror apparatus wherein the same provides structure for mounting to each side of an associated automobile wherein signal apparatus mounted within the mirror housing in electrical association with a vehicular turn signal circuitry effects visual indication of intended maneuvering of an associated automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic view taken along the lines 4—4 of FIG. 3 in the direction indicated by the arrows.

FIG. 5 is an isometric illustration of a modified mirror structure utilized by the instant invention.

FIG. 6 is an isometric illustration of the mirror structure as illustrated in FIG. 5 in an open configuration.

FIG. 7 is an isometric illustration of the mirror structure of the instant invention mounting replacement bulbs therewithin.

FIG. 8 is an isometric illustration of the instant invention mounting replacement bulbs and an accessory wiping cloth therewithin.

DESCRIPTION OF THE PREFERRED EMBODIMENT

Figure 1:
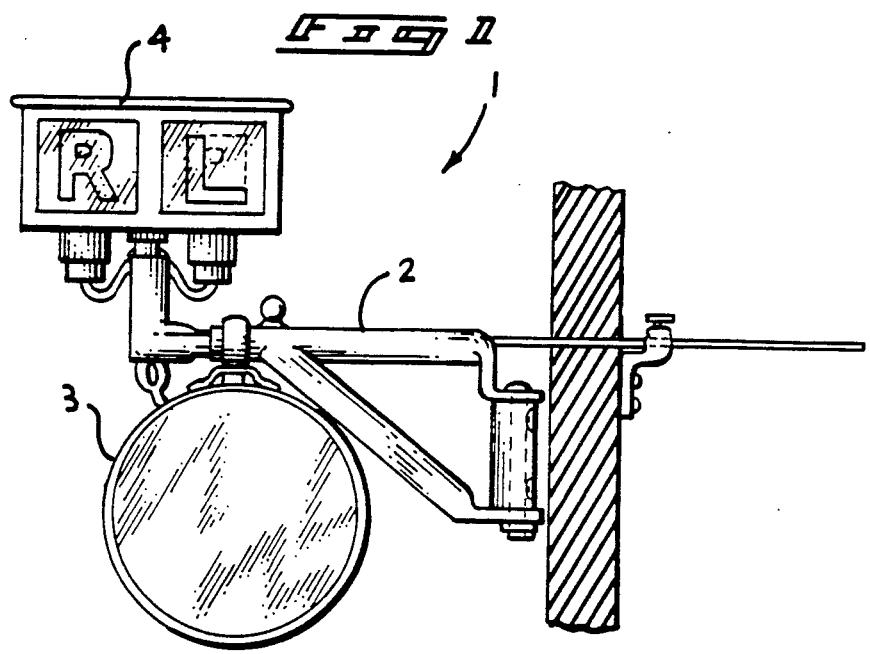
FIG. 1 is an orthographic frontal view taken in elevation of a prior art side view mirror structure.

With reference now to the drawings, and in particular to FIGS. 3 to 8 thereof, a new and improved vehicular signal mirror apparatus embodying the principles and concepts of the present invention and generally designated by the reference numerals 10 and 10a will be described.

Figure 2:
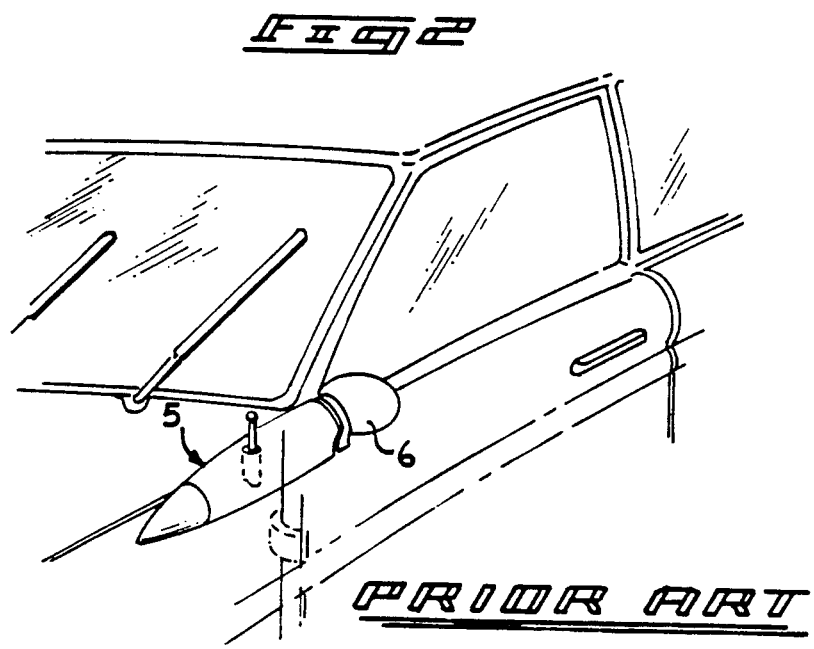
FIG. 2 is an isometric illustration of a further prior art side view mirror structure.

FIG. 1 illustrates a prior art vehicular signal structure 1 wherein a framework 2 mounts a mirror 3 thereunder with a housing 4 mounted overlying the framework including a plurality of compartments for selective indication of a right or left turn signal. FIG. 2 illustrates a streamlined housing 5 mounting a mirror 6 therebehind wherein as noted in U.S. Pat. No. 3,522,584 illumination member is mounted in an embodiment within the housing for actuation upon opening of an associated door structure of the motor vehicle mounting the housing.

More specifically, the vehicular signal mirror apparatus 10 of the instant invention essentially comprises, a housing 11 including a right side wall 12, a left side wall 13 with a housing floor 25 and as well as a top wall and a rear wall to define a housing including a housing entrance opening 16 with a reflective mirror 17 mounted within the entrance opening. The mirror 17 may be pivotally mounted for adjustment within the housing or optionally utilize a cable or motorized system to effect adjustment of the mirror. The mirror 17 includes a mirror pivot connection 20 positioned medially of a rear surface of the mirror with a support rod 21 directed downwardly therefrom (see FIG. 6 for example) to provide manual adjustment of the mirror. A support boss 14 is integrally mounted orthogonally to the right side wall 12 and includes a through extending bore to receive an electrically conductive signal wire 15. The electrically conductive signal wire 15 is directed interiorly of the housing within the housing cavity 19 and is in operative association with a signal bulb 27. The signal wire 15 is arranged for electrical communication with the turn signal circuitry of an associated vehicle mounting the mirror structure wherein accordingly the housing 11 as illustrated will be mounted to indicate a left turn signal while a mirror type construction of a cooperative mirror (not shown) will be mounted to a right side of an associated vehicle and in operative association with a right turn signal wherein both such structures will be mounted to operate in association with the hazard warning flasher utilized by conventional automobiles. For purposes of illustration, as the housing structures are of merely mirror image reproductions of one another, it is deemed sufficient that the left side housing be described. The left side wall 13 includes a translucent lens 18 mounted thereto to overly a left side wall opening 13a wherein the signal bulb 27 is mounted within a concave reflective lens housing 26.

FIGS. 5 through 8 illustrate a modified housing organization wherein a housing forward frame 22 includes an elongate hinge 24 mounting the framework to the housing floor 25 within the housing cavity 19 while a latch member 31 mounted to a top leg of the frame 22 is cooperative with a latch flange 31a mounted downwardly relative to the top wall of the housing 11 to effect selective securement of the continuous frame 31 to the housing 11 while the housing 11 includes a continuous entrance edge 23 defined by a predetermined configuration complementary a predetermined configuration defined by the continuous forward frame 22. The cavity 19 within the housing 11 includes a series of replacement bulbs 28 mounted within housing floor sockets 29 where each is arranged to secure the bulbs therewithin as well as a cleansing cloth 30 for selective cleaning of the mirror 17 as required in maintenance of the organization.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular signal mirror apparatus comprising:

a housing, the housing including a central cavity with a first side wall spaced from a second side wall;

a top wall overlying a bottom wall;

a support boss integrally mounted to the first side wall, the support boss including a through-extending aperture directed through the support boss with the aperture in communication with the central cavity;

a translucent lens mounted on the second side wall;

a concave reflective lens mounted within the housing and positioned interiorly of the second side wall in alignment with the translucent lens;

a second side wall opening defined between the translucent lens and the reflective lens;

a signal bulb mounted within the reflective lens;

an electrically conductive signal wire directed from the signal bulb in electrical communication therewith through the first side wall and the support boss;

the central cavity including an entrance opening;

a reflective mirror overlying the entrance opening, the reflective mirror adjustably mounted relative to the entrance opening;

wherein the entrance opening is defined by a continuous entrance edge, a forward framework overlies the entrance edge, the entrance edge is defined by a predetermined configuration, and the forward framework defines a configuration substantially equal to the predetermined configuration, and wherein the reflective mirror is mounted within the forward framework, the forward framework includes an elongate hinge, the elongate is hinge mounted to a lower leg of the forward frame and to the bottom wall of the housing and further including a latch member mounted to an upper leg of the forward framework cooperative with a latch flange mounted to interior surface of the top wall of the housing, and wherein the mirror includes a pivot connection, the pivot connection includes a support rod mounted to the pivot connection and the support rod is mounted to the lower leg of the forward framework.

2. Apparatus as set forth in claim 1 wherein the central cavity includes a series of aligned sockets, the sockets each including a replacement bulb mounted therewithin.

3. Apparatus as set forth in claim 2 including a cleansing cloth mounted within the central cavity for effecting selective cleansing of the reflective mirror.

* * * * *